United States Patent
Farooq et al.

(10) Patent No.: US 9,216,708 B1
(45) Date of Patent: Dec. 22, 2015

(54) BUMPER ASSEMBLY INCLUDING AIRBAG

(71) Applicant: Ford Global Technologies, LLC, Dearborn, MI (US)

(72) Inventors: Iskander Farooq, Novi, MI (US); Manoharprasad K. Rao, Novi, MI (US); Jialiang Le, Canton, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 14/288,929

(22) Filed: May 28, 2014

(51) Int. Cl.
| B60R 21/01 | (2006.01) |
| B60R 19/20 | (2006.01) |
| B60R 21/36 | (2011.01) |
| B60R 21/0134 | (2006.01) |

(52) U.S. Cl.
CPC .............. B60R 19/205 (2013.01); B60R 19/20 (2013.01); B60R 21/0134 (2013.01); B60R 21/36 (2013.01); B60R 2021/01218 (2013.01); B60R 2021/01225 (2013.01)

(58) Field of Classification Search
CPC ...... B60R 19/20; B60R 19/205; B60R 21/36; B60R 21/0134; B60R 2021/01218; B60R 2021/01225

USPC .................. 180/274; 280/728.1, 728.2, 743.1; 296/187.04; 701/36, 45, 49
See application file for complete search history.

(56) References Cited

U.S. PATENT DOCUMENTS

| 3,874,695 | A | 4/1975 | Abe et al. |
| 5,106,137 | A | 4/1992 | Curtis |
| 6,950,014 | B2 | 9/2005 | Rao et al. |
| 7,258,191 | B1* | 8/2007 | Rammer ............... B60R 19/205 180/274 |
| 8,041,483 | B2 | 10/2011 | Breed |
| 2002/0079679 | A1 | 6/2002 | Thiele et al. |
| 2004/0107033 | A1* | 6/2004 | Rao ..................... B60R 21/0156 701/45 |
| 2006/0091653 | A1 | 5/2006 | De Mersseman et al. |
| 2012/0298438 | A1 | 11/2012 | Lee et al. |
| 2014/0151990 | A1* | 6/2014 | Kim ..................... B60R 19/205 280/762 |

* cited by examiner

*Primary Examiner* — Adam Tissot
(74) *Attorney, Agent, or Firm* — Frank A. MacKenzie; Bejin Bieneman PLC

(57) ABSTRACT

A bumper assembly for a vehicle includes a bumper beam and an energy absorbing member adjacent the bumper beam. An airbag module includes an inflator coupled to the bumper beam and an airbag coupled to the inflator. The airbag is disposed between the bumper beam and the energy absorbing member. The airbag is deployed during an impact between the vehicle and an object to modify the stiffness of the bumper assembly during the impact.

15 Claims, 9 Drawing Sheets

BUMPER ASSEMBLY INCLUDING AIRBAG

BACKGROUND

A front structure of a vehicle includes a bumper assembly that is supported by a frame of the vehicle. The bumper assembly includes a bumper beam coupled to the frame of the vehicle and a fascia mounted to the bumper beam to provide an aesthetic show surface.

Bumper assemblies are designed to satisfy regulatory requirements and public domain testing involving front end impacts. As one example, vehicles are subjected to testing by the Insurance Institute for Highway Safety (IIHS) and bumper assemblies are, in part, designed to satisfy such testing. Regulatory requirements and public domain testing account for not only the safety of occupants inside the vehicle, such as during vehicle-to-vehicle impacts, but also account for pedestrians outside of the vehicle. These various tests can create conflicting requirements that complicate the design of the front structure.

One testing metric, for example, is directed toward the ability of the vehicle to remain undamaged during low speed impacts and is tested by the Low Speed Damageability (LSD) test. In the LSD test, the vehicle must withstand an impact with an object of a particular size at low speeds, e.g., 15 kilometers/hour, without any visible damage to the vehicle, including the front bumper.

Other testing and requirements are directed toward protecting pedestrians. For example, testing in various countries requires that the front bumper be designed to reduce the likelihood of injury to the pedestrian during an impact of up to 50 kilometers/hour.

In order to accommodate the LSD test, bumper assemblies may be designed to be stiff to prevent damage to the exterior of the bumper assembly during a low speed impact. For example, an energy absorbing beam may be added to the bumper assembly inside the fascia to absorb energy during low speed impacts. On the other hand, bumper assemblies may be designed to be flexible to reduce the likelihood of injury to a pedestrian during impact with the pedestrian. As such, it is clear that these two tests impose conflicting demands on the design of bumper assemblies, i.e., one favoring a stiff bumper assembly and one favoring a soft bumper assembly, and complicate the design of the bumper assembly in order to accommodate both tests. Accordingly, there remains an opportunity to design a bumper assembly that addresses both of these tests.

DETAILED DESCRIPTION

Figure 1:
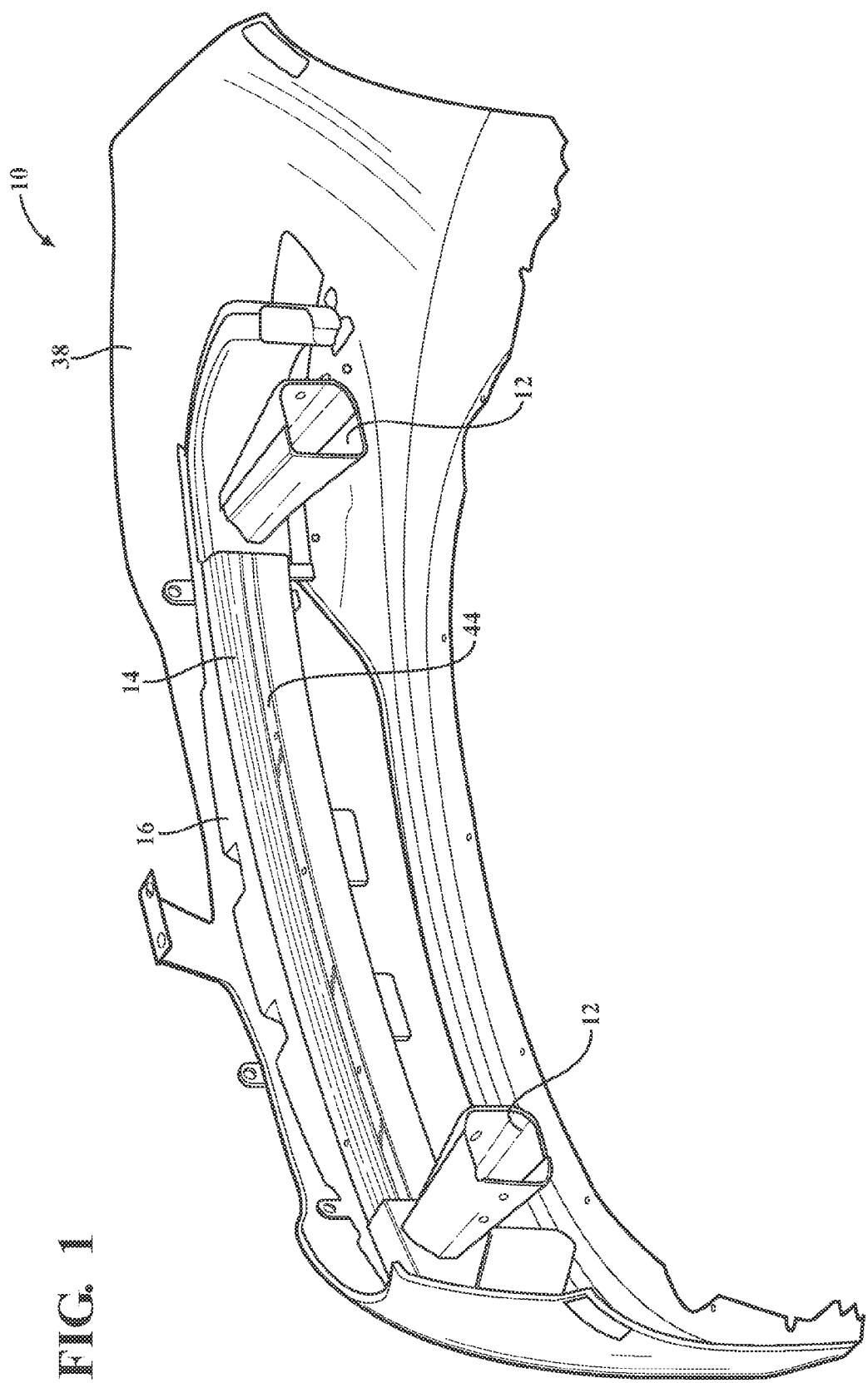
FIG. 1 is a perspective view of a bumper assembly for a vehicle including a bumper beam, an energy absorbing member, and an airbag module.
Figure 2:
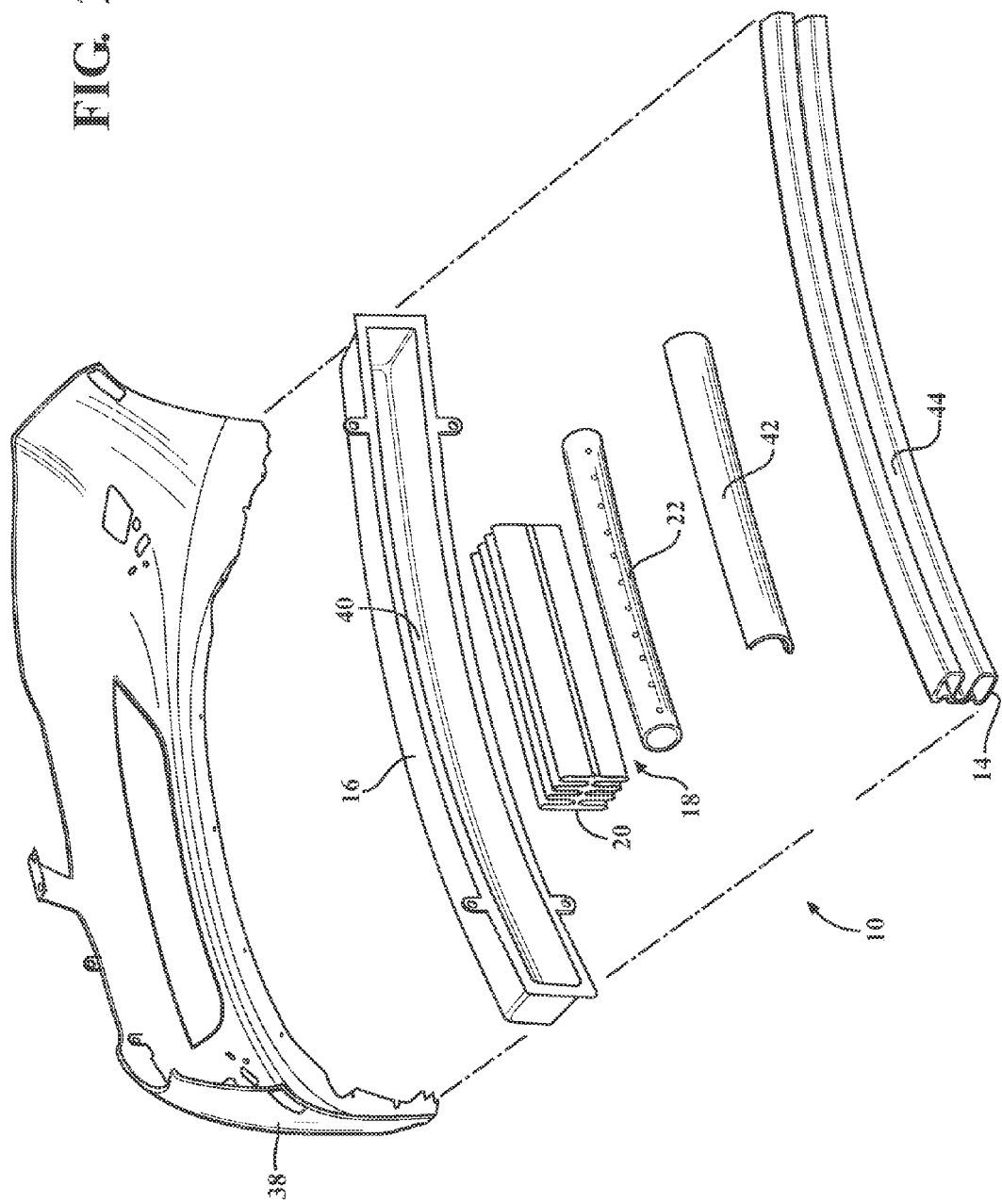
FIG. 2 is a partially exploded view of the bumper assembly of FIG. 1.
Figure 3:
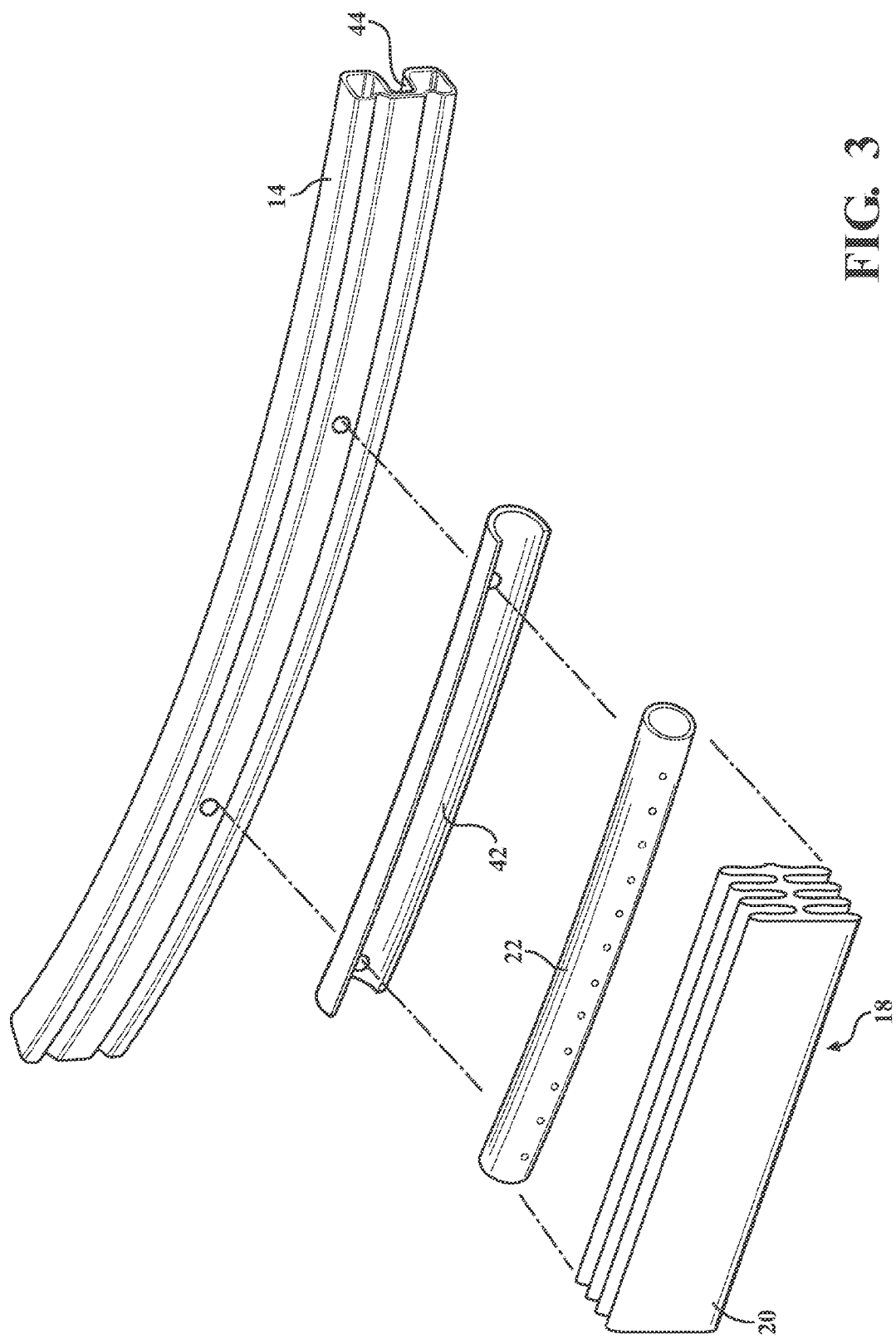
FIG. 3 is a partially exploded view of the bumper beam and the airbag module.

With reference to the Figures, wherein like numerals indicate like parts throughout the several views, a bumper assembly 10 for a vehicle is generally shown. The bumper assembly 10 includes a bumper beam 14 and an energy absorbing member 16 adjacent the bumper beam 14. An airbag module 18 includes an inflator 22 supported by the bumper beam 14 and an airbag 20 coupled to the inflator 22. The airbag 20 is encased in a plastic or similar material (not shown) that breaks when the airbag 20 is inflated. The airbag 20 may be disposed between the bumper beam 14 and the energy absorbing member 16.

Figure 4:
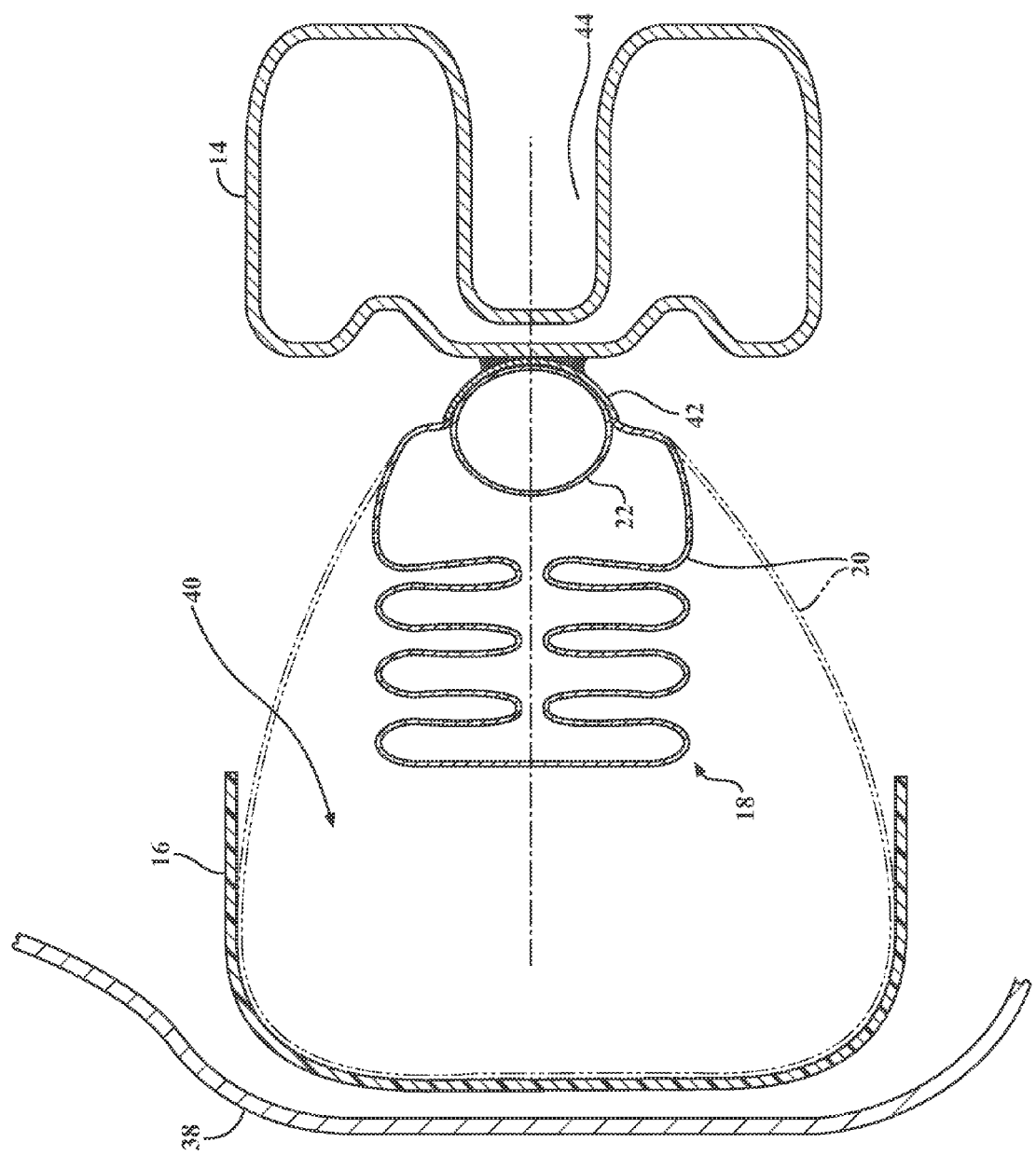
FIG. 4 is a cross-sectional view of the bumper assembly of FIG. 1 with an airbag of the airbag module shown in a deflated state and shown with broken lines in a deployed state.
Figure 5:
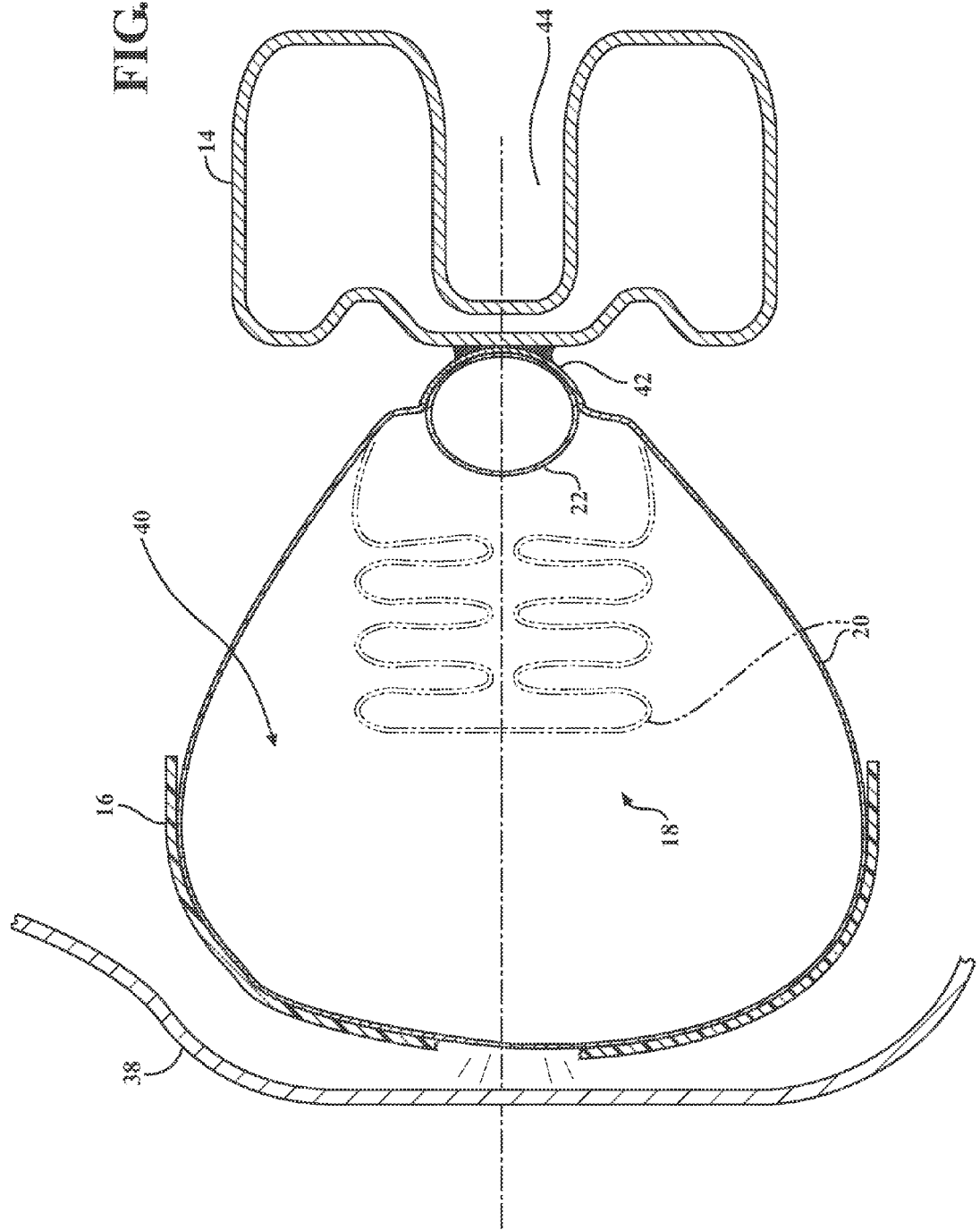
FIG. 5 is a cross-sectional view of the bumper assembly with the airbag in the deployed state and breaking through the energy absorbing member.
Figure 6:
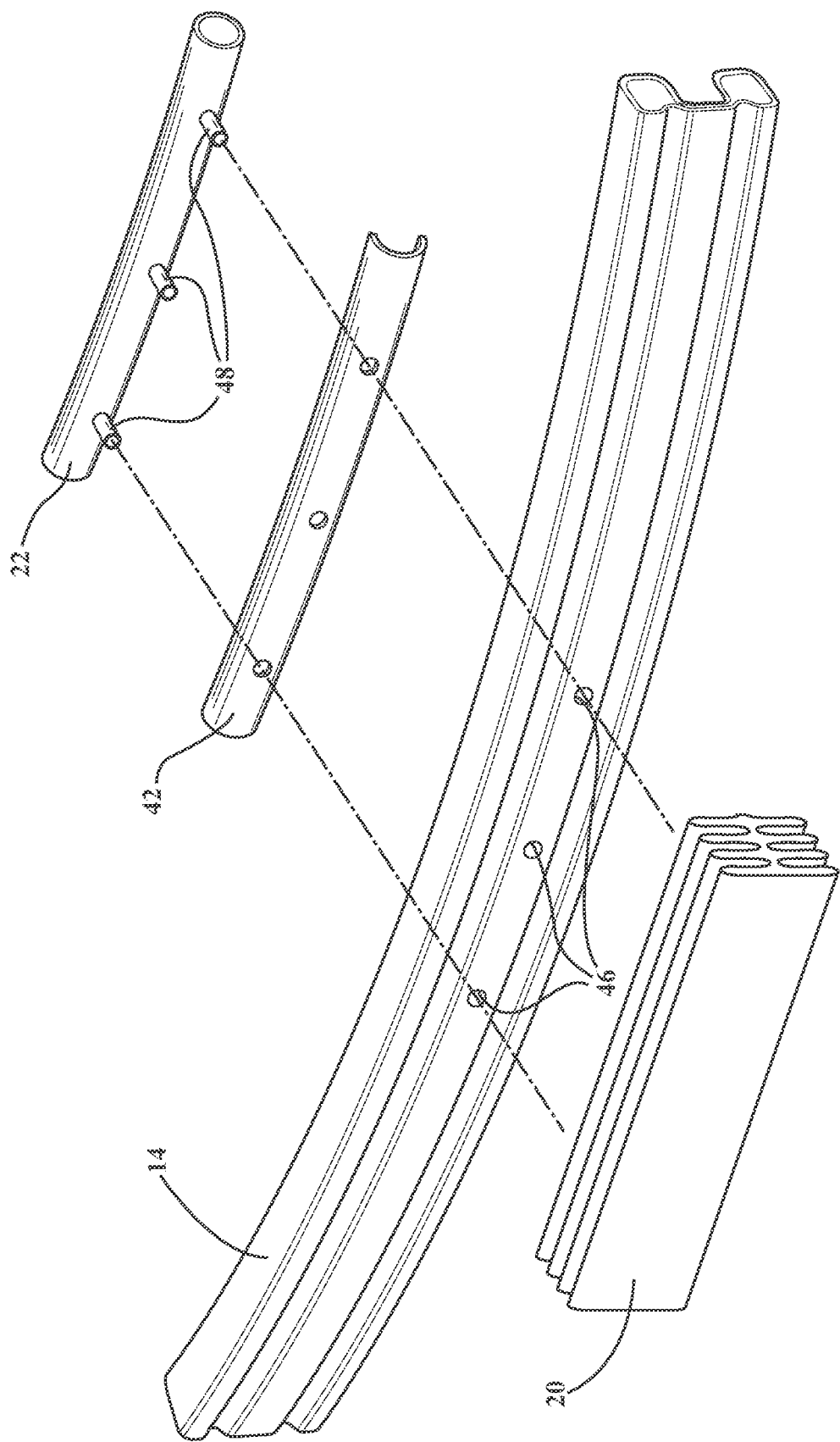
FIG. 6 is a partially exploded view of another embodiment of the bumper assembly.

During normal operation of the vehicle, the airbag 20 is in a deflated state, as shown in FIGS. 4 and 6. During a frontal impact, the airbag 20 is inflated to a deployed state, as shown in broken lines in FIGS. 4 and 6 and as shown in FIG. 5. The deployed airbag 20 absorbs energy during the frontal impact. As set forth further below, the vehicle includes an impact sensing system 24, i.e., a pre-crash sensing system, for sensing a frontal impact before the frontal impact occurs and for instructing the inflator 22 to deploy the airbag 20 prior to and/or during the frontal impact.

The airbag module 18 may be adaptive to inflate the airbag 20 at a selected inflation rate and/or to a selected volume based on a type of impact to select the stiffness of the airbag 20 when inflated. In particular, the inflator 22 may be a controlled output inflator that can be selectively activated to inflate the airbag 20 at a selected inflation rates and/or to a selected volumes to accomplish a desired stiffness and/or inflation time. As one example, the controlled output inflator may be a variable output inflator that is configured to selectively inflate the airbag 20, e.g., continuously, at a selected inflation rate and/or to a selected volume. As another example, the controlled output inflator 22 may be a multi-stage inflator that can be activated in stages to inflate the airbag 20 at a selected inflation rate and/or selected volume. The inflator 22 may alternatively be a fixed output inflator configured to inflate the airbag 20 to a single inflation rate and volume. The inflator 22 may be activated in any suitable way such as cold gas, gyro technique micro gas generator, etc.

In the configuration where the inflator 22 is a controlled output inflator, the inflator 22 can inflate the airbag 20 to one of several different deployed states each corresponding to a different type of impact. For example, each different deployed state can have a different inflation rate and/or different inflation volume based on the type of impact to select the stiffness of the airbag 20 when inflated. The different types of impact, for example, can include an impact with an object of a first type (not shown), e.g., a pedestrian, and an impact with an object of a second type (not shown), e.g., a vehicle. Specifically, the different types of impacts may also include different types of pedestrian impacts, for example, based on the speed of the vehicle, size of the pedestrian, etc. The different types of impacts can include different types of vehicle-to-vehicle impacts such as full frontal, partial offset, oblique impact, 50% overlap impact, etc.

During an impact with an object of the first type, e.g., a pedestrian, as sensed by the impact sensing system 24, the controlled output inflator inflates the airbag 20 to a deployed state consistent with the object of the first type. For example, when the first type is a pedestrian, the airbag 20 is deployed to a pedestrian deployed state, which can include inflation at a lower rate and/or volume than during a vehicle-to-vehicle impact to select a lower stiffness of the airbag 20 when inflated. In other words, during a pedestrian impact, the controlled output inflator operates at a low power deployment to inflate the airbag 20 to the pedestrian deployed state.

Similarly, during an impact with an object of a second type, e.g., a vehicle, as sensed by the impact sensing system 24, the controlled output inflator 22 inflates the airbag 20 to a deployed state consistent with the object of the second type. For example, when the second type is a vehicle, the airbag 20 is deployed to a vehicle-to-vehicle deployed state, which can include inflation at a higher rate and/or volume than during a pedestrian impact to select a higher stiffness of the airbag 20 when inflated. In other words, during a vehicle-to-vehicle impact, the controlled output inflator operates at a high power deployment to inflate the airbag 20 to the vehicle-to-vehicle deployed state. For example, during a low speed impact, the controlled output inflator may operate at a high power deployment to inflate the airbag 20 to a relatively stiff state for stiffening the bumper assembly 10 during a LSD test.

By inflating the airbag 20 differently for impact with different types of objects, e.g., pedestrians or other vehicles, the stiffness of the bumper assembly 10 may be modified to a desired level for a particular type of impact, i.e., softer for pedestrian impact and stiffer for low speed impact such as that experienced during a LSD test. Also, the airbag module 18 and the impact sensing system 24 are integrated with the currently existing active and passive safety systems of the vehicle. In addition, the compact and integrated nature of the airbag module 18 and impact sensing system 24 advantageously increases the flexibility in styling and design of the exterior of the vehicle.

Figure 9:
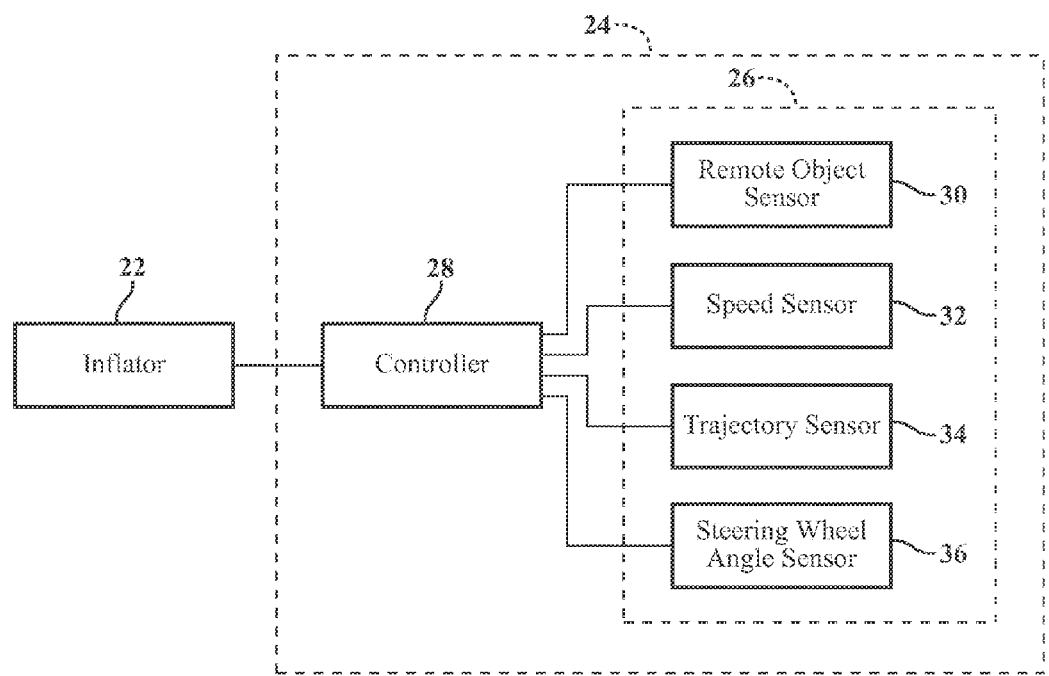
FIG. 9 is a schematic of an impact sensing system connected to an inflator of the airbag module.

With reference to FIG. 9, the impact sensing system 24 may include at least one impact sensor 26 and a controller 28. The impact sensor 26 is configured to sense the object prior to impact between the vehicle and the object. The impact sensor 26 may also be configured to sense conditions of the vehicle. The controller 28 is configured to identify a condition of an impact between the vehicle and an object based on the condition of the impact sensed by the impact sensor 26 and to determine an inflation rate of the airbag 20.

The impact sensor 26 may be further defined as a plurality of impact sensors of the same or of different types. For example, the plurality of impact sensors may include a remote object sensor 30 coupled to controller 28 to generate an object signal in the presence of an object within a field of view. The remote object sensor 30 may include one or more types of sensors including radar, lidar, and/or a vision system. The vision system may include one or more cameras, CCD image sensors, and/or CMOS image sensors, etc. The remote object sensor 30 is configured to sense the presence and the distance of an object from the vehicle and may determine characteristics of the detected objects, such as, radar reflective properties, the area, height, and/or width of the object.

With continued reference to FIG. 9, the plurality of impact sensors may also include a speed sensor 32 for detecting the speed of the vehicle, a trajectory detector 34 to measure the trajectory of the vehicle, e.g., straight, turning, etc., a steering wheel angle sensor 36 for measuring the rotation of the steering wheel, etc. It should be appreciated that the impact sensors 26 may include any suitable number or type of sensors.

The controller 28 may be a microprocessor-based controller. The impact sensors 26 are in communication with the controller 28 to communicate data to the controller 28. Based on the data communicated by the impact sensors 26, the controller 28 instructs the inflator 22 to inflate the airbag 20 at a selected rate and/or to a selected volume.

Figure 8:
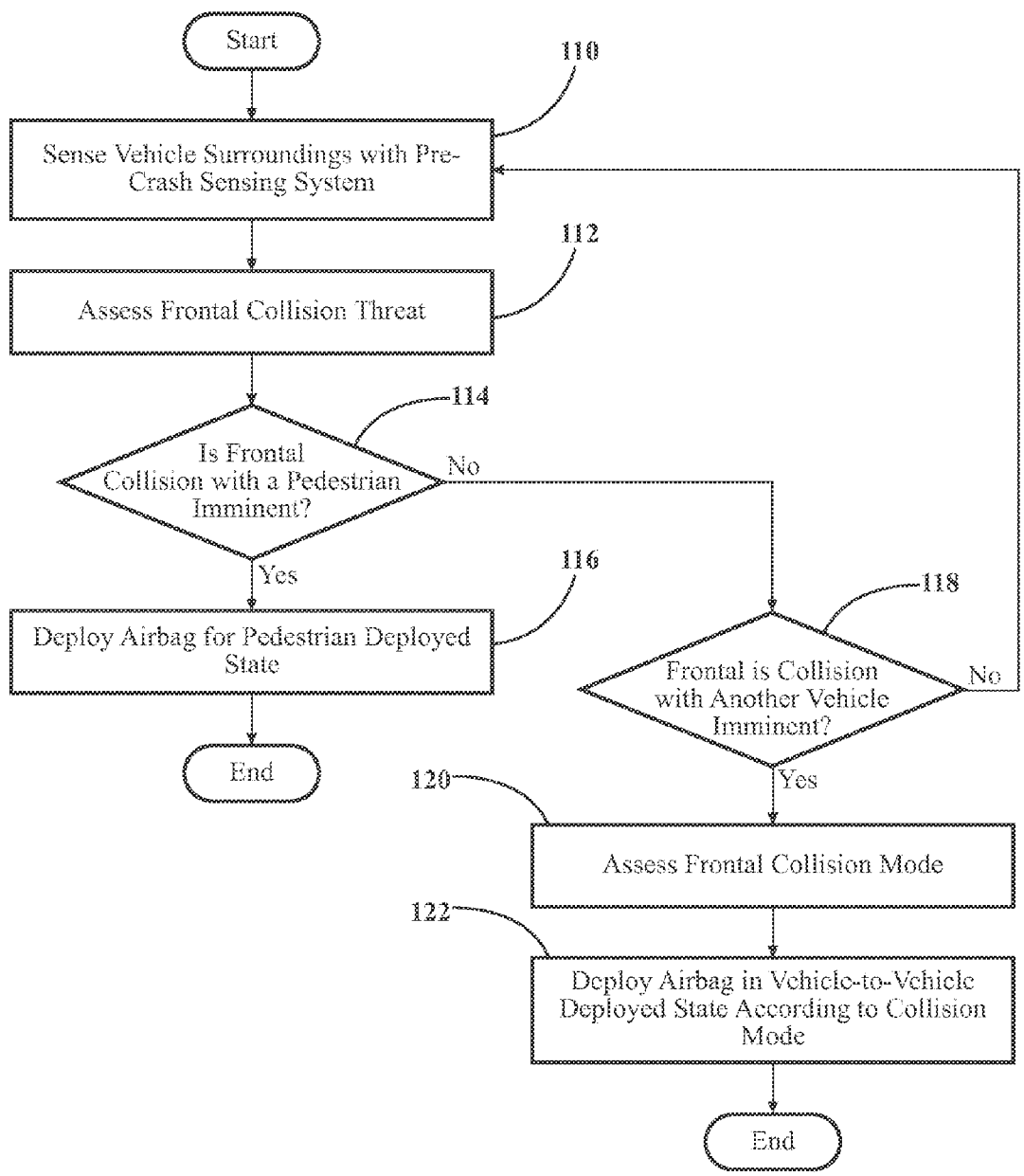
FIG. 8 is a flow chart showing the operation of the airbag module based on the type of impact to which the vehicle is subjected.

FIG. 8 shows an example of operation of the impact sensing system 24. With reference to FIG. 8, the impact sensing system 24 senses the surroundings of the vehicle, as shown in block 110. The impact sensing system 24 detects an imminent impact between the vehicle and an object. In particular, the impact sensors 26 sense the imminent impact.

As shown in block 112, the impact sensing system 24 assesses a frontal collision threat. The impact sensing system 24 classifies the object as one of the first type and the second type, for example, one of a pedestrian and another vehicle. Specifically, if the plurality of impact sensors 26 detect an object, the impact sensors 26 communicate data regarding the detected object to the controller 28. The controller 28 determines whether the sensed object is an object of the first type or an object of the second type, e.g., a pedestrian or another vehicle, based on the data from the plurality of impact sensors. The controller 28 selects at least one of an inflation rate and an inflation volume of the airbag 20 based on the classification of the object to select the stiffness of the airbag 20 when inflated.

As shown in block 114, with continued reference to FIG. 8, when the impact sensing system 24, e.g., the controller 28, identifies that the sensed object is of the first type, e.g., a pedestrian, the impact sensing system 24 next identifies whether impact is imminent. If impact is not imminent, the impact sensing system 24 takes no action. If impact is imminent, the controller 28 instructs the controlled output inflator 22 to inflate the airbag 20 to a predetermined state, e.g., to the pedestrian deployed state. Specifically, as shown in block 116, the controller 28 instructs the inflator 22 to inflate the airbag 20 at a preselected inflation rate and/or inflation volume based on the classification, e.g., to the pedestrian inflation state when the object is classified as a pedestrian. As set forth above, the airbag 20 inflates between the bumper and the energy absorbing member 16.

With continued reference to FIG. 8, when the impact sensing system 24, e.g., the controller 28, identifies that the sensed object is of the second type, e.g., another vehicle, the impact sensing system 24 next identifies whether the impact is imminent, as shown in block 118. If impact is not imminent, the impact sensing system 24 takes no action. If impact is imminent, the impact sensing system 24 assesses a mode of the frontal impact, as shown in block 120. The controller 28 instructs the controlled output inflator 22 to inflate the airbag 20 to a predetermined state, e.g., to the vehicle-to-vehicle deployed state. Specifically, the controller 28 instructs the inflator 22 to inflate the airbag 20 at a preselected inflation rate and/or inflation volume based on the identified mode, e.g., to the vehicle-to-vehicle inflation state when the object is classified as another vehicle, as shown in block 122. As set forth above, the airbag 20 inflates between the bumper beam 14 and the energy absorbing member 16. As also set forth above, at least one of the inflation rate and the inflation volume is higher when the object is classified as another vehicle.

As one example, when the controller 28 determines, based on data from the impact sensors 26, that impact is imminent with another vehicle at a low speed, the controller 28 instructs the inflator 22 to inflate the airbag 20 between the bumper beam 14 and the energy absorbing member 16 at the high power deployment. This stiffens the bumper assembly 10 in situations tested by the LSD test. In other words, the controller 28 instructs the inflator 22 to inflate the airbag 20 to stiffen the bumper assembly 10 during a low speed impact.

The bumper assembly 10 includes a fascia 38 covering at least a portion of at least one of the bumper beam 14 and the energy absorbing member 16. The fascia 38 may be formed of any suitable plastic polymer, for example, a paintable plastic polymer. The fascia 38 may be flexible relative to the energy absorbing member 16 and the bumper beam 14.

The energy absorbing member 16 may be disposed between the bumper beam 14 and the fascia 38. The energy absorbing member 16 may be connected to the bumper beam 14 or, alternatively, may be fixed to another component of the vehicle. The energy absorbing member 16 may be mounted in a position spaced from the fascia 38 in a pre-impact condition. Alternatively, the energy absorbing member 16 may abut the fascia 38 in a pre-impact condition.

The energy absorbing member 16 deforms to absorb energy during a frontal impact, for example, during low speed impact for LSD tests. The energy absorbing member 16 absorbs energy during a frontal impact in both circumstances when the airbag 20 inflates and in circumstances when the airbag 20 does not inflate.

The energy absorbing member 16 is formed of a suitable material and/or shape to deform to absorb energy during a frontal impact of the vehicle. The energy absorbing member 16 may be formed of foam, polypropylene plastic, or any other material suitable for absorbing energy during a frontal impact of the vehicle. The energy absorbing member 16 includes a cavity 40 defining a U-shaped cross-section for deforming during a frontal impact of the vehicle.

With reference to FIGS. 4-6, the cavity 40 of the energy absorbing member 16 faces the bumper beam 14 and receives the airbag 20. In the deflated state, as shown in solid lines in FIGS. 4 and 6, the airbag 20 is folded in the cavity 40 and encased (not shown) as set forth above. In the deployed state, as shown in broken lines in FIGS. 4 and 6, the airbag 20 fills the cavity 40. As the airbag 20 inflates from the deflated state to the deployed state, the airbag 20 may move the energy absorbing member 16 toward the fascia 38 and away from the bumper beam 14 (not shown). In addition, or in the alternative, the airbag 20 may split the energy absorbing member 16, as shown in FIG. 5, and protrude through the energy absorbing member 16 toward the fascia 38 (not shown). The airbag 20 may also extend through the fascia 38 during deployment of the airbag 20.

With reference to FIGS. 3-7, the airbag module 18 may include a bracket 42 mounted to the inflator 22. The bracket 42 is mounted to the bumper beam 14. For example, the bracket 42 may be bolted to the bumper beam 14, welded to the bumper beam 14, or fixed to the bumper beam 14 in any other suitable fashion. The bracket 42 may be metal, for example.

With reference to FIGS. 1-7, the bumper beam 14 may define a cavity 44. For example, the bumper beam 14 may be W-shaped or C-shaped in cross-section.

With reference to FIGS. 1-5, the inflator 22 may be disposed between the bumper beam 14 and the energy absorbing member 16. In other words, the inflator 22 may be mounted to a front of the bumper beam 14. In such a configuration, both the inflator 22 and the airbag 20 are exposed to the cavity 40 of the energy absorbing member 16.

Figure 7:
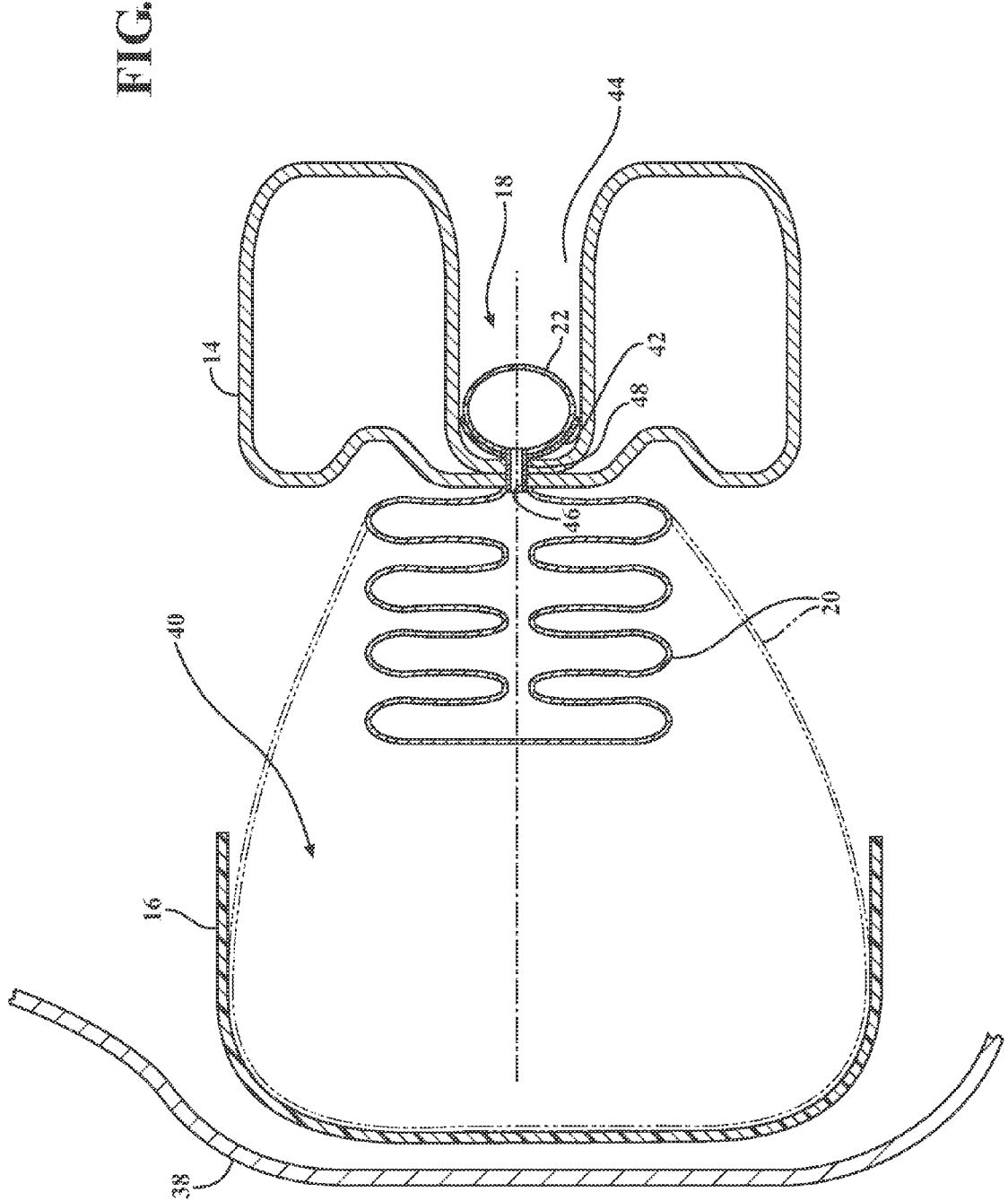
FIG. 7 is a cross-sectional view of the bumper assembly of FIG. 6.

Alternatively, with reference to FIGS. 6 and 7, the bumper beam 14 may be disposed between the inflator 22 and the energy absorbing member 16. In other words, the inflator 22 is mounted to a rear of the bumper beam 14. In such a configuration, the bumper beam 14 may protect the inflator 22 from damage, e.g., during a frontal impact. As shown in FIG. 6, the inflator 22 may be mounted in the cavity 44 of the bumper beam 14.

With reference to FIGS. 6 and 7, the bumper beam 14 defines a hole 46 with the airbag 20 and the inflator 22 in communication through the hole 46. The inflator 22 may include a pipe 48 that extend through the hole 46 and engages the airbag 20, as shown in FIGS. 6 and 7. Alternatively, the airbag 20 may extend through the hole 46 to the inflator 22. The bumper beam 14 may include any number of holes 46 and the inflator 22 may include a correspond number of pipes 48. By way of example, the bumper beam 14 shown in FIG. 6 includes three holes 46 and the inflator 22 includes three pipes 48.

As set forth above, the energy absorbing member 16 may frangible relative to the airbag 20 during inflation of the airbag 20. For example, the energy absorbing member 16 may be forced toward the fascia 38 by the airbag 20 during inflation of the airbag 20. In such a state, the force applied by the airbag 20 against the energy absorbing member 16 may break a connection between the energy absorbing member 16 and the rest of the vehicle, e.g., the bumper beam 14. In addition or in the alternative, the airbag 20 may split the energy absorbing member 16 during inflation.

The vehicle may be any type of vehicle. For example the vehicle may be an automobile. It should be appreciated that the bumper assembly 10 may be used with any suitable type of vehicle. The bumper assembly 10 is mounted to the rest of the vehicle, for example, with the use of arms 12 that are connected to the rest of the vehicle. For example, the arms 12 may be attached to a frame of the vehicle.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A bumper assembly for a vehicle, the bumper assembly comprising:
   a bumper beam;
   an energy absorbing member adjacent the bumper beam; and
   an airbag module including a controlled output inflator supported by the bumper beam in a cavity of the bumper beam and an airbag coupled to the controlled output inflator and disposed between the bumper beam and the energy absorbing member;
   the bumper beam being disposed between the inflator and the energy absorbing member.

2. The bumper assembly as set forth in claim 1 further comprising a controller configured to identify a condition of an impact between the vehicle and an object and to determine at least one of an inflation rate and an inflation volume of the airbag based on the condition of the impact.

3. The bumper assembly as set forth in claim 2 further comprising an impact sensor in communication with the controller and configured to sense the object before impact between the vehicle and the object.

4. The bumper assembly as set forth in claim 1 wherein the energy absorbing member defines a cavity facing the bumper beam and receiving the airbag.

5. The bumper assembly as set forth in claim 1 wherein the bumper beam defines a hole with the airbag and the inflator in communication with each other through the hole.

6. The bumper assembly as set forth in claim 1 further comprising a fascia covering at least a portion of at least one of the bumper beam and the energy absorbing member with the energy absorbing member disposed between the bumper beam and the fascia.

7. The bumper assembly as set forth in claim 1 wherein the energy absorbing member is frangible relative to the airbag during inflation of the airbag.

8. A bumper assembly for a vehicle, the bumper assembly comprising:
a bumper beam;
an energy absorbing member adjacent the bumper beam; and
an airbag module including an inflator supported by the bumper beam in a cavity of the bumper beam and an airbag coupled to the inflator, the bumper beam being disposed between the inflator and the energy absorbing member and the airbag being disposed between the bumper beam and the energy absorbing member.

9. The bumper assembly as set forth in claim 8 wherein the bumper beam defines a hole with the airbag and the inflator in communication with each other through the hole.

10. The bumper assembly as set forth in claim 9 wherein the energy absorbing member defines a cavity facing the bumper beam and receiving the airbag.

11. The bumper assembly as set forth in claim 8 wherein the inflator is a controlled output inflator.

12. The bumper assembly as set forth in claim 11 further comprising a controller configured to identify a condition of an impact between the vehicle and an object and to determine an inflation rate of the airbag based on the condition of the impact.

13. The bumper assembly as set forth in claim 12 further comprising an impact sensor in communication with the controller and configured to sense the object before the impact between the vehicle and the object.

14. The bumper assembly as set forth in claim 8 wherein the energy absorbing member defines a cavity facing the bumper beam and receiving the airbag.

15. The bumper assembly as set forth in claim 10 further comprising a fascia covering at least a portion of at least one of the bumper beam and the energy absorbing member with the energy absorbing member disposed between the bumper beam and the fascia.

* * * * *